(12) United States Patent
D'Amato et al.

(10) Patent No.: US 6,226,241 B1
(45) Date of Patent: May 1, 2001

(54) COMPACT DISC RECORDING SYSTEM AND METHOD

(75) Inventors: Andrea D'Amato; Fabrizio Caffarelli, both of San Jose, CA (US)

(73) Assignee: Roxio, Inc., Milpitas, CA (US)

( * ) Notice: Subject to any disclaimer, the term of this patent is extended or adjusted under 35 U.S.C. 154(b) by 0 days.

(21) Appl. No.: 09/573,082

(22) Filed: May 16, 2000

Related U.S. Application Data

(63) Continuation of application No. 08/710,072, filed on Sep. 9, 1996, now Pat. No. 6,091,686, which is a continuation of application No. 08/397,660, filed on Feb. 28, 1995, now abandoned.

(51) Int. Cl.[7] ....................................................... G11B 5/09
(52) U.S. Cl. .................................. 369/47.15; 369/124.08
(58) Field of Search ........................ 369/32, 47.1, 47.15, 369/47.22, 47.55, 47.21, 47.47, 47.54, 53.24, 53.37, 53.45, 124.07, 124.08; 360/48

(56) References Cited

FOREIGN PATENT DOCUMENTS

| 0 507 397 A2 | 3/1992 | (EP) . |
| 0 712 139 A1 | 5/1996 | (EP) . |
| WO 93/09496 | 5/1993 | (WO) . |

*Primary Examiner*—Paul W. Huber
(74) *Attorney, Agent, or Firm*—Martine Penilla & Kim, LLP (57) ABSTRACT

An improved file system and method for incrementally recording data on compact discs is disclosed. The improved file system and method employs compact discs physically formatted in accordance with the so-called Orange Book specification. Files to be stored are selected from time to time and are divided into packets. The packets are then recorded in a program area of the compact disc together with link, run-in and run-out blocks in a format compatible with the Orange Book rules for linking incrementally recorded packets. File linking information is also stored with each file. If desired, files may, but need not, be recorded in a form compatible with existing CD-ROM and drivers adhering to the ISO-9660 standard. As selected files are recorded, file and directory information are stored in a first storage area either in a host system or in a track of the compact disc in a double linked and highly efficient format. From time to time, and if desired, this information may be recorded in ISO 9660 format in a reserved first track of a session. This may occur upon closing the session, at some other time, or not at all. Multiple sessions may be recorded on the same compact disc.

32 Claims, 8 Drawing Sheets

SCSI WRITE COMMAND

| BYTE | BIT 7 | BIT 6 | BIT 5 | BIT 4 | BIT 3 | BIT 2 | BIT 1 | BIT 0 |
|---|---|---|---|---|---|---|---|---|
| 0 | OPERATION CODE (0 Ah) | | | | | | | |
| 1 | LOGICAL UNIT NUMBER | | | LOGICAL BLOCK NUMBER (MSB) | | | | |
| 2 | LOGICAL BLOCK ADDRESS | | | | | | | |
| 3 | LOGICAL BLOCK ADDRESS (LSB) | | | | | | | |
| 4 | TRANSFER LENGTH | | | | | | | |
| 5 | CONTROL | | | | | | PACKET MODE | |

| | |
|---|---|
| 00 | WRITE ENTIRE PACKET WITH RUN-IN AND RUN-OUT |
| 01 | WRITE RUN-IN AND BEGINNING OF PACKET (NO RUN-OUT) |
| 10 | WRITE BODY OF PACKET WITH NO RUN-IN OR RUN-OUT |
| 11 | WRITE END OF PACKET AND RUN-OUT (NO RUN-IN) |

COMPACT DISC RECORDING SYSTEM AND METHOD

This is a Continuation application of prior application Ser. No. 08/710,072, filed on Sep. 9, 1996, now U.S. Pat. No. 6,091,686, which is a continuation application of prior application Ser. No. 08/397,660, filed on Feb. 28, 1995, now abandoned.

BACKGROUND OF THE INVENTION

Technical Field

The invention relates generally to the recording of data on compact discs, and, more particularly, to an improved file system for incremental recording of data onto compact discs.

Since the introduction of the first compact disc players in about 1983, compact disc technology has taken the consumer electronics and computer industries by storm. What was once a little known technology used primarily to reproduce high fidelity audio information for the listening pleasure of a fortunate few has become a widely used medium for the storage and delivery of a variety of different types of information to a large number of individuals and for a wide variety of applications. Today for example, everything from computer programs and games to audio programs to video and multi-media programs are distributed on compact disc.

However, while the use of compact discs as a means for distributing a wide variety of digital information sources to end users has advanced considerably, the relative unavailability of compact disc recording technology, coupled with certain technical limitations thereof have, until recently, kept compact disc technology from becoming a viable mass storage alternative for most end users, and particularly users of personal computers. In the past, compact disc recording devices (CD-R's) were very expensive, making them unavailable as a practical matter to most personal computer users. Recently, however, prices have declined to the level where many users of personal computers can now easily afford to include a CD-R as part of their systems.

Availability, however, is only part of the problem. While the arrival of relatively inexpensive CD-R technology is a welcome advance, its ultimate usefulness to personal computer users remains significantly limited by certain problems and limitations described hereinafter.

Over the years, technical specifications and standards have been adopted for both the physical layout of data recorded on compact discs and for the logical format and organization of the data. The great majority of manufacturers of compact discs, disc players, and disc recorders have adopted the physical layout standards defined in the so-called Red (also known as IEC 908), Yellow (also known as ISO/IEC 10149), and Orange books produced by Sony and Philips, which are incorporated herein by reference. The logical file structure which has become the industry standard is the so-called ISO 9660 standard, which has been widely published and which is also incorporated herein by reference. It is estimated that today there is an installed base of more than 50 million compact disc players which adhere to these industry standards and this installed base continues to grow.

The Yellow and Red Book standards are primarily intended to support the recording of a large volume of data (up to a capacity of 650 megabytes on a 74 minute disc) onto a compact disc in a single, uninterrupted write. This works well for publishers and others who use CD's, in this case referred to as CD-ROMs, primarily to distribute large volumes of data. Most personal computer users, however, require the capability to incrementally store one or more data files on a mass storage device from time to time, and to read these files back at other times. While the Orange Book standard provides a physical format which supports incremental recording of data, a logical file structure that can work within the physical standard to provide incremental recording capability useful to personal computer users is still needed.

Under the current standards, a recordable compact disc is divided into a fixed number of blocks (also called sectors). A disc's capacity is measured in terms of minutes, seconds, and sectors. There are 75 sectors in each second, so a 74-minute disc, for example, contains 333,000 sectors, i.e., 74 minutes×60 seconds/minute×75 sectors/second. The actual amount of user data that can be recorded in a sector varies with the physical format used to record the disc. In the physical format most commonly used to record computer data, i.e., the Yellow Book standard, each sector contains 2 kilobytes of data. Thus, in this format a 74-minute disc can contain up to approximately 650 megabytes of data.

Under the current Orange Book standard, a disc can have multiple sessions. Each session comprises a lead-in area, which contains certain control and other information used by the CD player hardware, a program area in which user data is recorded, and a lead out area. A session is closed by recording the lead-in and lead-out areas after the data to be recorded is recorded in the program area. The lead-in and lead-out areas for the first session occupy a total of approximately 23 megabytes of disc storage space. The lead-in and lead-out areas for each subsequent session occupy a total of approximately 13 megabytes of disc storage space.

Under the current Orange Book and ISO 9660 standards, data is most often recorded onto compact disc using the so-called "track at once" method. In this method, each time data is recorded onto a disc, it is written in consecutive physical sectors in a single track. The physical standard imposes a limit of 99 tracks per disc, which may be distributed between one or more sessions. Each track is preceded by a short pre-gap. In order for recorded files to be read back by existing CD-ROM players, an ISO 9660 file structure must be recorded for the data in each track. This file structure may or may not describe files which were previously recorded in other tracks of the same disc. In addition, before any recorded file can be read, the session containing the track in which the file is recorded must be closed.

These existing standards present significant limitations for the personal computer user who wishes to use CD-R as an incremental mass storage device. For example, at any given time a computer user may have only one or a small number of relatively small files to record, perhaps totalling only a few hundred kilobytes. In order to gain access to these files via a current CD-ROM player, the user would have to close the session containing the track in which the files are recorded. Thus, in this typical scenario, session overhead of between 13–23 megabytes is required to gain access to files totaling only a few hundred kilobytes. It will be recognized that the more often a user repeats this scenario to gain access to his data, the more storage space he will lose. Moreover, an entire ISO 9660 file structure must be rerecorded for each track or set of tracks recorded in each track at once write. Thus, if the user desires at some time to record a single update to a previously recorded file, for example, a new session must be opened and an entire ISO 9660 file structure must be written for the single track containing the single updated file.

A new logical file structure specification supporting incrementally written files has been proposed by the European Computer Manufacturers' Association (ECMA). ECMA has proposed a specification, referred to as ECHA 168 (also known as DIS 13490), which is an extension of the ISO 9660 specification. The ECMA 168 specification is also incorporated herein by reference.

The Orange Book and ECMA 168 specifications together define a physical recording method and format and a logical file structure which support incrementally recording data onto compact disc in "packets" of fixed or variable length. Files written from the host to the CD-R to be recorded on the compact disc are divided into one or more packets, which are recorded in consecutive physical locations. In order to accommodate the incremental recording of data at different times, each packet is preceded by a link block and four run-in blocks, and followed by two run-out blocks. These additional blocks are necessary for the CD-R hardware to determine where recording was last interrupted and where recording can next begin.

However, the Orange Book/ECMA 168 packet recording method still has significant limitations. One is that it is not compatible with existing CD-ROM players and device drivers (or software extensions) that adhere to certain levels of the Yellow Book/ISO 9660 specifications. Such players and their device drivers do not recognize link, run-in and run-out blocks which may be interspersed with recorded packets. They return a "read error" and abort further playback operation when such blocks are encountered.

CD-ROM designs which recognize and skip over the link and run blocks have been proposed in an effort to avoid these "read error" problems. However, while this solution might be feasible when only fixed length packets are to be written, it is extremely difficult to implement when variable length packets of unknown size are to be written. Moreover, these changes are incompatible with the huge installed base of existing ISO 9660 compatible CD-ROM players. These existing players will never be capable of reading from compact disc media recorded via the packet method as proposed by ECMA.

Furthermore, the directory, path and file structures proposed by ECMA require extensive amounts of linking and relinking each time a file or directory is updated. They are so complex they are generally suitable only for applications where only a small number of incremental writes are anticipated. Otherwise the structures quickly become too complex and unwieldy and require too much space and overhead to maintain.

There thus exists a need for an improved file system for supporting incremental recording of data onto compact discs, which overcomes the many heretofore enumerated problems and limitations of the prior art systems and methods. The elimination of these problems and limitations would finally make CD-R technology a viable, inexpensive, ultra high capacity, alternative to the ever growing mass storage needs of personal computer users.

It is therefore one object of the present invention to provide an improved file system and method capable of supporting the incremental recording of data files onto compact disc.

It is another object of the present invention to provide such a file system and method that support data files incrementally recorded onto compact disc efficiently and with minimal overhead requirements.

It is another object of the present invention to provide such a file system and method capable of providing rapid access to incrementally recorded files.

It is still another object of the present invention to provide such a file system and method which are flexible enough to be made compatible with the huge installed base of existing CD-ROM players and drivers, and also with future CD-ROM player and driver designs.

It is a further object of the present invention to provide such a file system and method which are flexible in implementation, and which facilitate the recovery of data in case of errors or interruptions.

It is a still further object of the present invention to provide such a file system and method which will find use with relatively inexpensive standard CD-R's which may be used with personal computer systems.

These and other objects, advantages and features of the present invention will become clear to those skilled in the art by reference to the following summary of the invention, detailed description of a presently preferred embodiment of the invention, and the appended drawings and claims.

SUMMARY OF THE INVENTION

The present invention substantially overcomes the problems and limitations of prior art compact disc file systems and methods by providing a new file system and recording method which supports incremental recording of date files on compact disc while retaining compatibility with existing Yellow Book/ISO 9660 compatible CD-ROM players and drivers.

In the system and method of the present invention, one or more files are from time to time selected to be stored on a compact disc of the type having a lead-in area, a program area and a lead-out area. Selection of the files may encompass creation, e.g., a scanner may be the source of a file selected for recording. For each file or files selected at a particular time, a determination is made of the total storage capacity necessary to store the files. A determination is also made of the availability of sufficient storage capacity in the program area of the compact disc to store the selected file or files. The files are formatted into one or more packets and the packets are recorded in the program area of the compact disc together with link, run-in and run-out blocks, and link information for other recorded packets. Information describing each file thus recorded and directory information are stored in a reserved storage location in a host system and/or on the compact disc. From time to time, the file information for all files previously recorded and the directory information may be recorded in a reserved track of the program area. The file location and directory information thus stored may, if desired, be made compatible with ISO 9660, ECMA 168 or another logical file structure standard at any time, and may ignore any link, run-in and run-out blocks to ensure compatibility with existing CD-ROM players and drivers. Multiple sessions can be created on the same disc by recording a lead-out area and repeating the process on a new section of the disc with another lead-in, program and lead-out area.

DESCRIPTION OF A PRESENTLY PREFERRED EMBODIMENT

Figure 1:
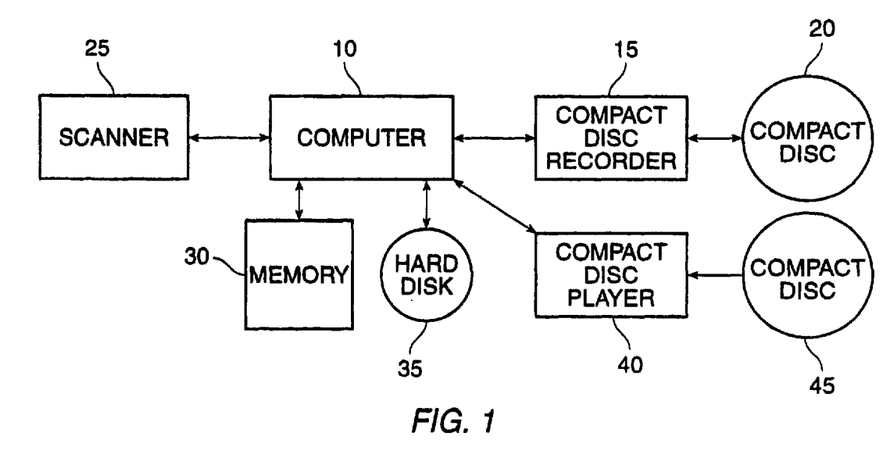
FIG. 1 is a block diagram illustrating an exemplary personal computer system incorporating a preferred embodiment of the present invention.

FIG. 1 illustrates an exemplary personal computer system with which a presently preferred embodiment of the file system of the present invention may be used. Computer 10 is suitably a standard stand-alone personal computer such as an IBM™ compatible or Apple Macintosh™ computer, although a workstation, networked computer, minicomputer, or other similar information processing device would also work. As is typical, computer 10 has memory 30 for temporarily holding programs and data, and a hard disk 35 for permanently storing files, which may be program, data, application or other files. It is understood that although these components are shown in FIG. 1 as being external to computer 10, the figure is merely for illustrative purposes and these components will usually be internal. Computer 10 may also have connected to it via one or more standard serial, parallel, small computer system interface (SCSI), or other known interfaces, a scanner 25 and/or other peripherals (not shown), such as a printer, floppy disk or the like.

In a presently preferred embodiment of the invention, the computer 10 is connected to an Orange Book compliant compact disc recorder (CD-R) 15 via a standard SCSI interface. However, it is understood that an ATAPI or other suitable interface could also be used. CD-R's suitable for use with the present invention are presently manufactured and sold by Sony, Ricoh, Yamaha, JVC, Plasmon, Philips, Kodak and others. For example, Sony manufactures and sells one such CD-R under the model designation CDU920S. Philips sells others designated models CDD521 and CDD522. Other than as described hereinbelow, the details of construction and operation of CD-R 15 is beyond the scope of this invention and is therefore omitted.

In a presently preferred embodiment, CD-R 15 operates with a standard Yellow and Orange Book compliant 120 mm diameter compact disc (CD) 20. However, it is expressly understood that the invention is not limited with respect to any particular physical parameters of the CD medium.

Computer 10 may also be connected to a CD-ROM player 40 via a standard SCSI, serial or other suitable interface. CD-ROM player 40 may be a standard ISO-9660/Yellow Book compatible player of the type currently in wide use, which reads standard 120 mm diameter ISO-9660/Yellow Book compatible compact discs 45. Alternatively, CD-ROM player 40 may be a newer multisession type player capable of reading multisession CD's as well. It should be understood that the system of FIG. 1 is shown with computer 10 connected to both CD-R 15 and CD-ROM player 40 to facilitate the description of a presently preferred embodiment of the invention, wherein CD's recorded by CD-R 15 may be read back to computer 10 either by CD-R 15 or CD-ROM player 40. However, it may well be that in actual practice a CD such as CD 20 or 45 is recorded by a CD-R connected to-one computer, and read back by a CD-ROM player connected to another computer.

Figure 2:
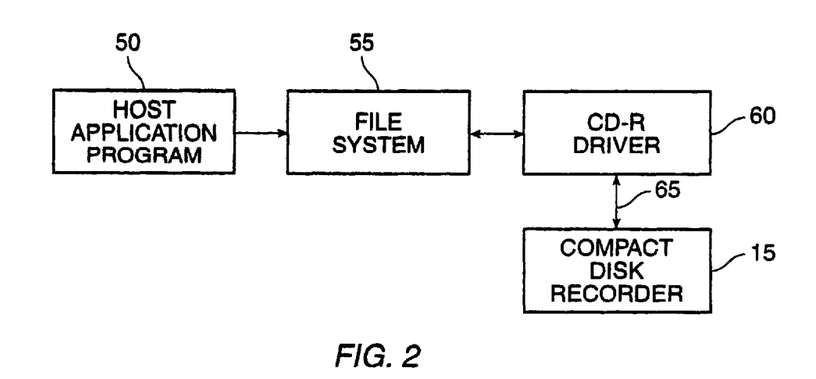
FIG. 2 is a block diagram illustrating the functional relationship between components of a preferred embodiment of the present invention.

As illustrated in FIG. 2, the file system 55 of the present invention is preferably interposed between host application program 50 and CD-R device driver 60. Host application program 50 may be any of a variety of different programs running in computer 10 that can select one or more files to be stored. Such programs may include word processing programs such as MicroSoft's Word® or WordPerfect Corporation's WordPerfect®, or file management programs such as MicroSoft® Windows™ File Manager, for example. They may also include CD-R specific file back-up programs written by the user or provided by the CD-R manufacturer.

A presently preferred embodiment of the file system 55 analyzes and formats the files selected for recording by the host application program 50, and creates file and directory structures in a manner described in further detail below. The preferred file system 55 communicates the formatted files and file/directory structure information to the compact disc recorder 15 via a conventional CD-R driver 60. In a presently preferred embodiment, the CD-R device driver 60 communicates with the CD-R 15 via SCSI commands over a standard SCSI interface 65, in a manner described in further detail hereinafter. However, it is understood that other suitable interfaces may be used.

When files previously recorded on CD-R 15 are to be read back, the preferred file system 55 reads and interprets the recorded file/directory structures to locate the desired files and format them for communication to the host application program 50.

A presently preferred embodiment of the file system 55 is designed to work with conventional Orange Book compliant CD-R's, and to have the capability to record compact discs that can be read by existing Yellow Book/ISO 9660 compatible compact disc players using standard drivers, such as the conventional Microsoft® MSCDEX driver (or software extension).

Figure 3:
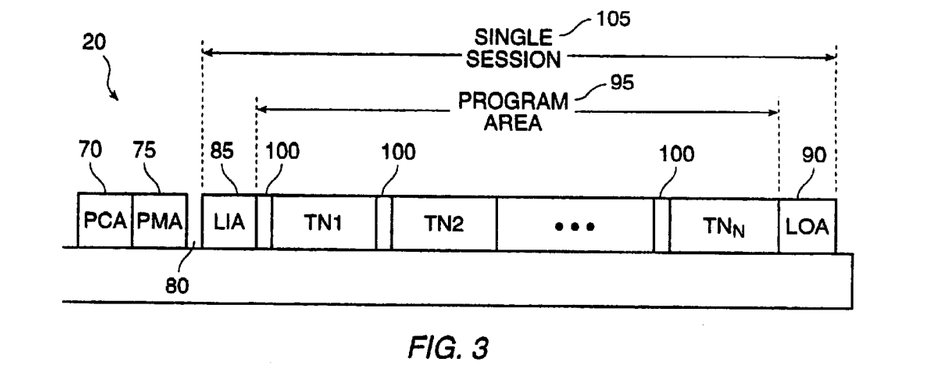
FIG. 3 is a schematic diagram illustrating the Yellow Book physical layout specification for compact discs.
Figure 4A:
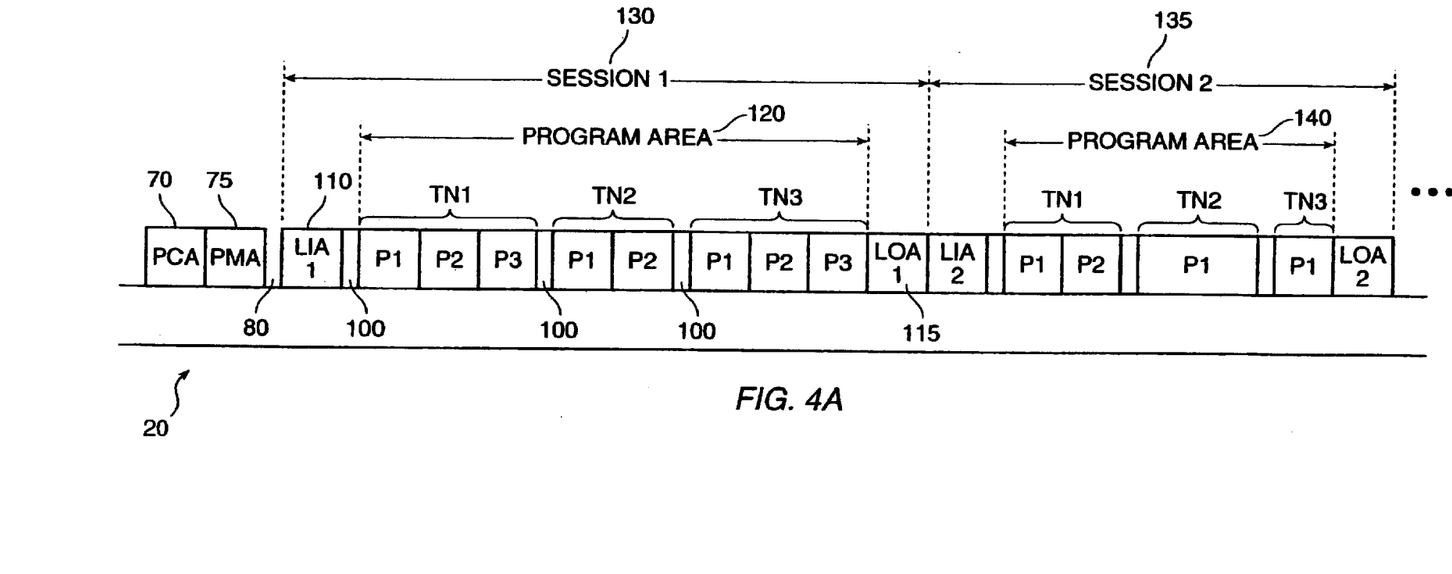
FIG. 4a is a schematic diagram illustrating the Orange Book physical layout specification for compact discs.
Figure 4B:
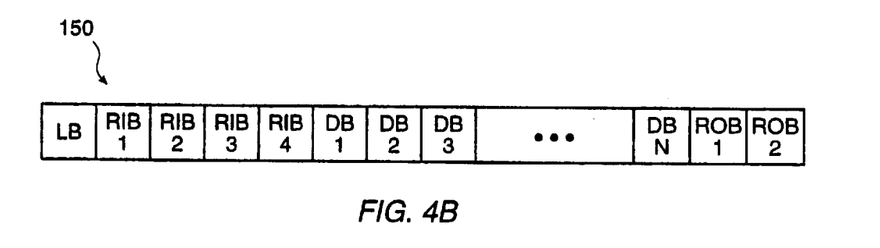
FIG. 4b is a schematic diagram illustrating the packet format used for incremental recording of data in the Orange Book specification.

FIGS. 3, 4a and 4b illustrate the conventional physical format specified for compact discs such as CD's 20 and 45, by the Yellow and Orange Books, respectively. As illustrated in FIG. 3, the Yellow Book specification defines a number of areas on the physical surface of a write once recordable compact disc (CD-WO) 20. Only one half of compact disc 20 is shown in FIG. 3. The left side of compact disc 20 represents the center of the compact disc and the right side the outside edge of the disc. The various areas depicted encircle the disc along an uninterrupted spiral track extending substantially from the center of the disc to the outside edge. Power Calibration (PCA) 70 and Program Memory (PMA) 75 areas are defined to occupy adjacent locations nearest the center of the disc. These areas are reserved for use by the CD-R hardware. A short unrecorded gap 80 separates the PCA and PMA areas from a lead-in area (LIA) 85. LIA 85 will contain control and mode information, as well as a table of contents for the tracks recorded on the disc. A corresponding lead-out area (LOA) 90 is defined to occupy a location adjacent the outside edge of the disc 20. The area between the LIA 85 and LOA 90 is defined to be a program area 95 in which user data is recorded. The program area 95 may be subdivided into a number of tracks TN1, TN2 . . . TNN, if desired, or may be maintained as a single contiguous area. If subdivided into tracks, each track is preceded by a short pre-gap 100. The area including the LIA, LOA and program area comprises a session 105.

Initially, the LIA and LOA areas are reserved. Files or other data to be recorded are broken into fixed or variable length blocks. The blocks are then physically recorded in the program area 95 in consecutive physical sectors in one or more tracks, TN1 etc. When all the data to be recorded has been written to the disc, the session may be closed by recording certain control, mode and track index information in the LIA and LOA areas. Additional details concerning the parameters and contents of the PCA, PMA, LIA, LOA, tracks and pre-gap are set forth in the Yellow Book specification and need not be repeated here.

Referring to FIG. 4a, the Orange Book specification also defines adjacent PCA 70 and PMA 75 areas near the center of the disc. Also similarly to the Yellow Book specification, a short gap 80 separates the PCA and PMA areas from a first lead-in area LIA1 110. Corresponding with LIA1 is a first lead-out area LOA1 115. The area between LIA1 and LOA1 comprises a first program area 120. The area comprised of LIA1, the first program area 120 and LOA1 comprises a first session 130.

A second session 135 having a second program area 140, and second lead-in (LIA2) and lead-out (LOA2) areas is also illustrated in FIG. 4a. Although only two sessions are shown, as many sessions may be created as desired, up to the storage capacity of the disc. Each session occupies an area adjacent to its immediately preceding and succeeding session (if any).

Each program area may be subdivided into multiple tracks if desired, three such tracks TN1, TN2, and TN3 being shown in each of the first program and second program areas 120 and 140. As in the Yellow Book specification, each track is preceded by a short pre-gap 100.

In order to facilitate the incremental recording of data, data is recorded in packets. For example, the data recorded in track TN1 of the first session 130 could be formatted in three packets P1, P2, and P3. Similarly, the data recorded in track TN2 of the first session 130 could be formatted in only two packets Pi and P2, and so on. Each packet 150 consists of a link block LB, four run-in blocks RIB1–4, a plurality of data blocks DBI–N, and two run-out blocks ROB1–2. The link, run-in and run-out blocks enable Orange Book compliant CD-R's to determine where a previous record operation ended and the next is to begin, and to sync up with the compact disc before beginning to record the next packet. Additional details concerning packet structure, parameters and contents are set forth in the Orange Book specification and need not be repeated here.

If the recorded disc is to be readable by existing ISO 9660 compatible compact disc players using existing drivers (or software extensions), such as MSCDEX, ISO 9660 directory, path and file structures must be recorded in the first track, i.e., TN1, of a session. Specific details of the ISO 9660 logical directory, path and file structures are contained in the published standard and need not be set forth in detail here. Generally, however, with reference to FIG. 5, the structures include a set of volume descriptors 160, which include a primary volume descriptor (PVD) 170. The PVD contains information describing the data comprising the particular volume to which the PVD corresponds. The PVD contains fields 175 and 180 for the address and size respectively of a path table 190. It also includes a copy of a root directory record 185.

Figure 5:
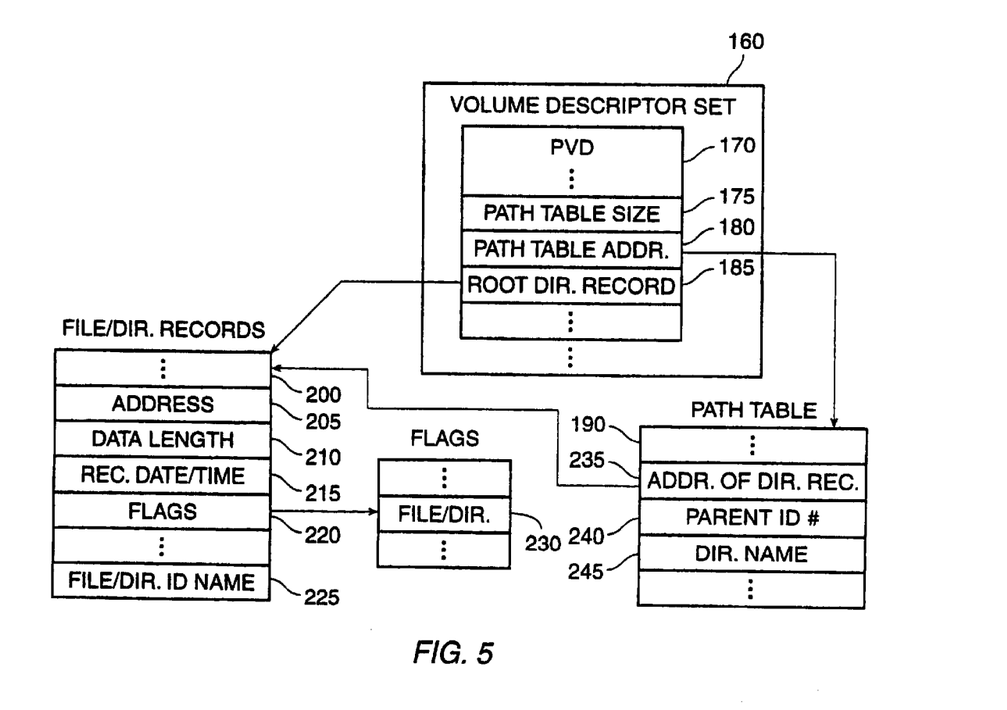
FIG. 5 is a schematic diagram illustrating the basic ISO 9660 logical file/directory structure specification for compact discs.

Each directory and each file in a directory is described by a file/directory record 200. The root directory record 185 in the PVD 170 is a copy of this record for the root directory. Each file/directory record 200 includes fields 205 and 210 containing the starting block address and length respectively of a file or directory entry. Each such record 200 also includes fields 215 and 225 containing the date and time the file or directory was recorded and the file or directory name. Each such record 200 also contains a flag field 220, which includes a flag 230 indicating whether the particular record is for a file or a directory entry. Each directory record contains a record that identifies its parent directory. File/directory records 200 are arranged in alphabetical order with each directory record being followed by the records for each subdirectory and then each file in the directory.

A path table 190 comprises a collection of directory ID records. Each such record includes fields 235, 240, and 245 for the address of a directory record 200, the ID # of the parent directory if the directory is a subdirectory, and the directory name, respectively. The PVD 170 field 180 points to the address of the first directory ID record of the path table 190. Thus, in the ISO 9660 structure a particular file or directory record may be located either by chaining down through the file/directory records 200, or directly via the path table 190.

To retain compatibility with existing ISO 9660 compatible CD-ROM players and drivers, each time an incremental change is to be recorded, for example a file is to be added, deleted, or changed, or a directory entry is to be added or deleted, the session containing the current ISO 9660 file/directory structures must be closed, a new session opened, the update recorded in the new session, and the entire ISO 9660 file/directory structure rewritten in the new session. This not only takes up a significant amount of disc storage for overhead, as described previously, it can also undesirably increase the seek time for particular files and directories, especially when a number of incremental changes or additions are made. Moreover, many existing versions of Yellow Book/ISO-9660 compatible single session CD-ROM players remain in use. These players cannot even read multi-session CD's. The present invention substantially overcomes these limitations.

In addition to the necessity to build and record the ISO 9660 file structure in a reserved first track of each session, it may also be necessary to adhere to certain other conventions to maintain compatibility with CD-ROM players and drivers (including software extensions such as MSCDEX) that implement lower levels of the ISO 9660 standard. Such players and drivers do not recognize link, run-in and run-out blocks and return errors when they are encountered. CD's incrementally recorded in Orange Book format can nevertheless, maintain compatibility with such players and drivers if the files recorded are formatted so that each packet contains one or more complete files and no file extends across more than one packet. If this convention is followed, then link, run-in and run-out blocks never occur interspersed with the data stream comprising the contents of a file. As a result, the CD-ROM player's read head never encounters these blocks. When a file is to be read, the read head is initially addressed to the starting logical block address of the packet containing the beginning of the file and so does not encounter the link or run-in blocks. As the read is completed, the read head encounters an end of file (EOF), which terminates the read, before encountering the run-out blocks.

Figure 6:
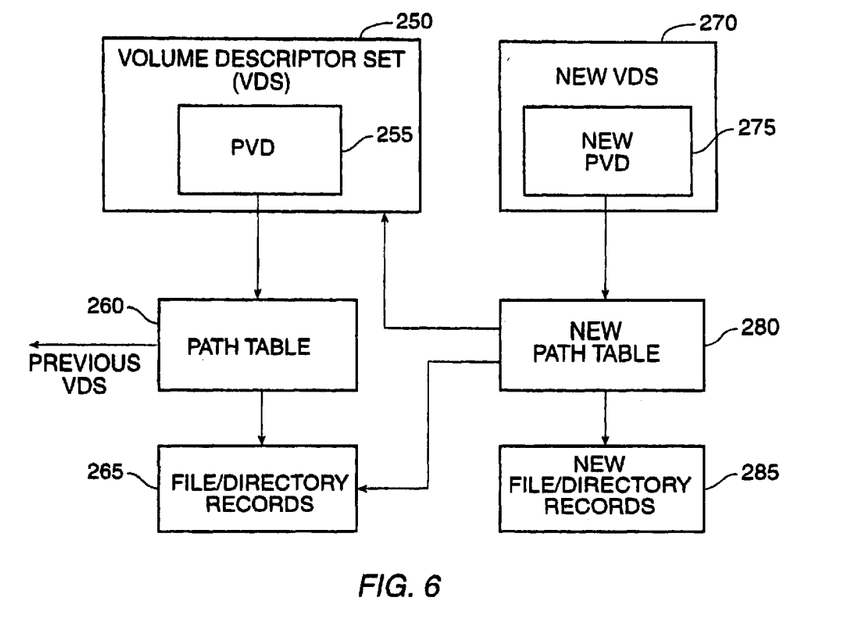
FIG. 6 is a schematic diagram illustrating the basic ECMA 168 logical file/directory structure specification for compact discs.

An alternative to the ISO 9660 logical file/directory structure is the logical file/directory structure proposed as ECMA 168. This proposed file/directory structure, which is an extension of the ISO 9660 structures, has been widely published and need not be repeated here. Generally, however, as shown in FIG. 6, the ECMA proposal includes a volume descriptor set (VDS) 250 similar to the ISO 9660 VDS 160. VDS 250 contains one or more primary volume descriptors (PVD's) 255. PVD 255 is similar to the ISO 9660 PVD 170. One major difference is that it does not include a root directory record or any direct pointer to file/directory records. PVD 255 contains a pointer to a path table 260, which is similar to the ISO 9660 path table 190. Path table 260 in turn contains pointers to a collection of file and directory records 265, which are similar to ISO 9660 file/directory records 200. Unlike the ISO 9660 file/directory structure, in the ECMA proposal when an incremental change is made to a file or directory, it is not necessary to rewrite the entire file/directory structure. In the ECMA 168 proposal, a new VDS 270 is created with a new PVD 275. The new PVD 275 contains a pointer to a new path table 280. The new path table 280 contains pointers to the unchanged file/directory records 265 and to any new or updated file/directory records 285. In addition, the new path table 280 contains a pointer to the previous VDS. The previous path table also contains a pointer to any immediately previous VDS, and so on.

It will be appreciated that while the file/directory structure proposed by ECMA 168 thus provides improved support over ISO 9660 for incrementally recorded files, the extensive and complex linking involved is burdensome and inefficient, especially when a fairly large number of incremental changes to files and/or directories may be involved.

The file system of the present invention is capable of maintaining compatibility with CD-ROM players and drivers at all levels of the ISO 9660 standard. In addition, the file system of the present invention is flexible enough to retain compatibility with future CD-ROM players and drivers, which may or may not retain compatibility with existing ISO 9660 standards, and even with CD-ROM players and drivers that may adopt the proposed ECMA 168 standard. At the same time, the file system of the present invention substantially overcomes the problems and limitations of the foregoing logical file/directory structure standards.

Figure 7:
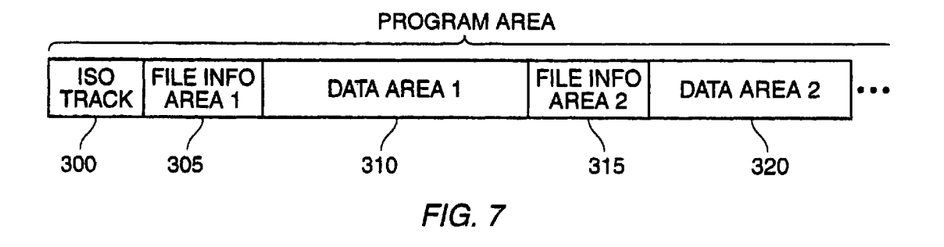
FIG. 7 is a schematic diagram illustrating a presently preferred logical file system format for a compact disc for use with the present invention.

Referring to FIG. 7, in a presently preferred form, the file system reserves a first track 300 of the program area, of each session for an ISO 9660, ECMA 168, or other file/directory structure. It should be appreciated that it is in no way necessary to record any such structures in track 300. Rather, track 300 is reserved in the event it is desired to record such structures for compatibility with ISO, ECMA, or another desired standard. As will be seen, a presently preferred file system according to the invention provides complete access to incrementally recorded files and directories with or without ISO and/or ECMA compatibility.

Following reserved first track 300 is a first File Information Area 305. Following and preferably contiguous with the first File Information Area 305 is a corresponding first Data Area 310. Following the first Data Area may be a second File Information Area 315 and Data Area 320, followed by additional corresponding pairs of such areas as desired or as necessary. Each File Information Area and each Data Area is preferably contiguous with the areas on either side. In a preferred embodiment, user file data is recorded in data areas 310, 320 etc. in a format to be described hereinbelow. File and directory structures describing the file and directory entries recorded in each data area are recorded in the corresponding file information areas 305, 315 etc., also in a format described below.

In a presently preferred embodiment, each file information area comprises a reserved track having a predetermined amount of storage space. The amount of storage space reserved for a file information area depends upon the application. However, for reasons that will be made clear below, a minimum of eight blocks or sectors is normally required—a minimum of one block for storage of file and directory structures, and seven blocks for link, run-in, and run-out information required for orange Book compliance.

Each data area also preferably comprises a track. However, the amount of storage space for a data area track is not necessarily fixed or predetermined. Rather, in a preferred embodiment, files and directory entries are recorded in a data area until the data area's corresponding file information area is full. At that time, the data area track is closed. A new track is then reserved for the next file information area and a new track opened for the next data area. Additional files and directory entries may be recorded in the new open data area track until such time as the reserved file information area track is again filled, and so on.

Figure 8:
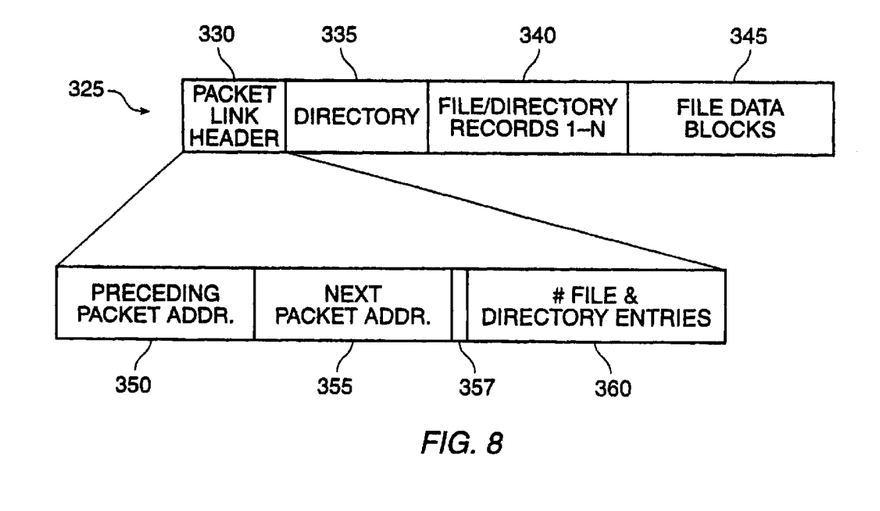
FIG. 8 is a schematic diagram illustrating a presently preferred packet format for incremental recording of files in connection with the present invention.

Files and directory entries recorded in a data area are preferably recorded in one or more packets having the format shown in FIG. 8. Each packet 325 preferably includes at least a packet link header 330, a directory field 335, 1-N file/directory records 340, and one or more file data blocks 345 comprising the contents of one or more files.

The packet link header 330 creates a double-linked chain between all of the packets 325 recorded in data areas. Thus, each packet in a data area is preferably linked to the immediately preceding and succeeding packets. The first packet in a data area is preferably linked to the last packet in the preceding data area, and the last packet in a data area is preferably linked to the first packet of the succeeding data area. This linked chain allows a complete file/directory structure to be constructed or reconstructed, if necessary, simply by sequentially accessing each packet in the chain. This is a significant feature of the present invention, in part because it is not necessarily desirable to record the file/directory structures corresponding to a recorded packet or set of packets in a file information area immediately. It will be recalled that each time a set of file/directory structures is recorded in the file information area, seven additional blocks of link, run-in, and run-out information must also be recorded. Accordingly, it is often preferable to buffer or cache file/directory information corresponding to recorded packets, for example in computer memory or on hard disk, until one or more blocks of such information are accumulated. This preferred approach minimizes the amount of storage space in the file information areas wasted on overhead relative to file/directory information. If the cached file/directory information should be somehow lost or corrupted before it can be recorded, it can be reconstructed from the linked list. Moreover, if an interruption or error should occur during the packet recording process, it is a straight forward matter to determine which packet was last successfully recorded and to continue recording with the next linked packet by simply chaining down the packets to the last one recorded.

Thus, the packet link header 330 preferably includes at least a first field 350 containing the starting absolute block address of the preceding packet and a second field 355 containing the starting absolute block address of the succeeding packet. In addition, the packet link header 330 preferably contains a third field 360 containing the number of file and directory entries contained in the packet.

The directory field 335 preferably provides temporary storage of information required to construct or reconstruct directory structures when a packet contains directory entry information. Thus, this field preferably includes at least the directory name, the identity of any parent and subdirectories, and a directory identification number.

The file/directory record field 340 contains a file/directory record for each file contained in the packet and/or for each directory entry, if any. Thus the number of file/directory records in field 340 matches the number of entries specified in packet link header field 330.

Figure 10:
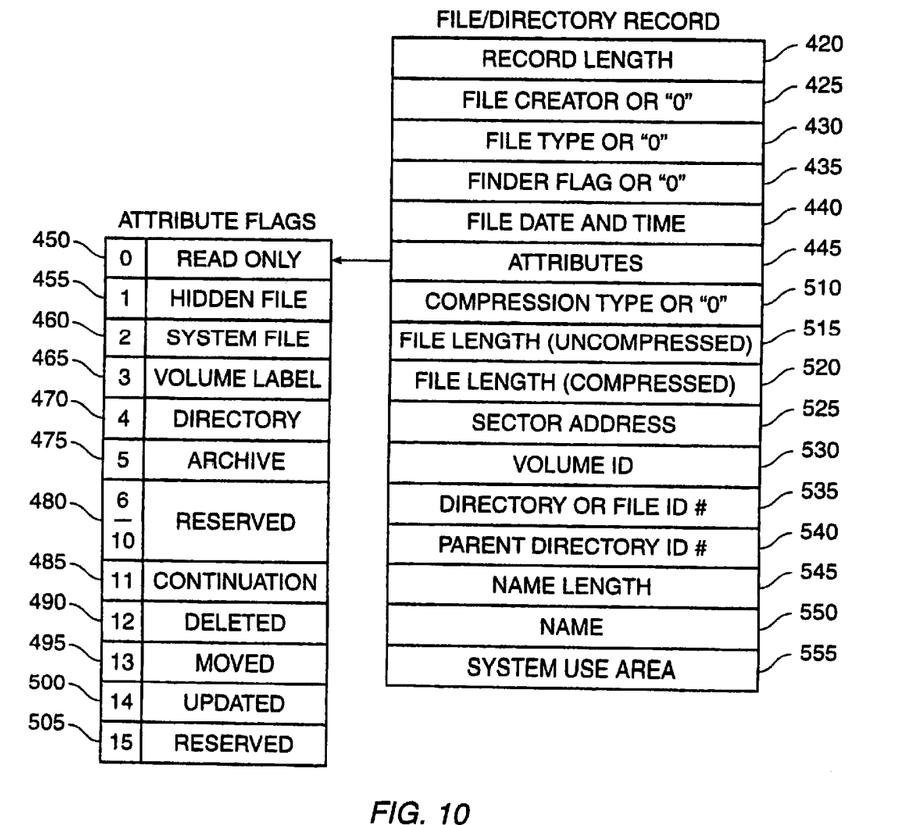
FIG. 10 is a schematic diagram illustrating a presently preferred file/directory record format for incremental recording of file and directory information in connection with the present invention.

Each file/directory record preferably has the format shown in FIG. 10. In a presently preferred form, each file/directory record is a variable length record. The first element of the record is preferably a field 420, which. provides the length of the record. The record may also include File Creator 425, File Type 430, and Finder Flag 435 fields if the invention is to be used in conjunction with personal computers manufactured by Apple. These fields are used by the Apple Macintosh operating system, for example, to identify and retrieve files. If not in use, these fields may be deleted or set to zero. Preferably a field 440 is provided for the file date and time. The file date and time are suitably in DOS format, for example, and comprise the date and time the file was created or, if modified, the date and time of the most recent modification.

Field 445 preferably is an attribute field which identifies certain attributes of the corresponding file or directory. The presence or absence of each attribute is preferably indicated by the state of a corresponding flag bit. Numerous different attributes may be used as desired. In a presently preferred embodiment of the invention, however, at least the following attribute flags are used. Attribute flag 450 indicates whether a file or directory is read only or read/write. Attribute flag 455 indicates whether a file or directory is hidden. Attribute flag 460 indicates whether a file is a system or a user file. Attribute flag 465 indicates whether the packet data corresponding to the current file/directory record is a volume label. Attribute flag 470 indicates whether the packet data corresponding to the current file/directory record is a file or a directory entry. Attribute flag 475 indicates an archive file similar to the convention used in DOS. Attribute flags 480 and 505, as well as others, may be reserved if desired for the later addition of other attributes. Attribute flag 485 indicates whether the file data corresponding to the current file/directory record is continued over multiple packets. As described in further detail hereinbelow, a unique feature of the presently preferred embodiment is its ability to record variable length packets, as well as very long files comprising a plurality of packet write operations, without interspersing link, run-in and run-out blocks with file data. This unique ability allows the present invention to record lengthy files efficiently while retaining compatibility with existing CD-ROM players and drivers implementing level 1 of the ISO 9660 standard. Attribute flag 490 indicates the file or directory entry corresponding to the current file/directory record has been deleted. Attribute flag 495 indicates the file corresponding to the current file/directory record has been moved to another directory. Attribute flag 500 indicates that the file corresponding to the current file/directory record is an updated version of an earlier recorded file.

Following the attributes field 445 is preferably a compression type field 510, which indicates whether the packet. data corresponding to the current file/directory record is compressed, and if so, the type of compression used. Fields 515 and 520 preferably contain the uncompressed and compressed lengths of the file corresponding to the current record. Field 525 preferably contains the starting absolute sector address for the corresponding file or directory. Field 530 preferably contains a numeric volume or session ID indicating the volume or session in which the corresponding file or directory is recorded. Field 535 preferably contains a numeric ID for the file or directory corresponding to the file/directory record, and field 540 preferably contains a numeric ID for the parent directory of the file or directory corresponding to the current file/directory record. Field 545 preferably contains the length of the name of the corresponding file or directory and field 550 preferably contains the character name of the file or directory. Field 555 is preferably reserved.

Similarly to the file and directory entry data recorded in the data areas, the file/directory description data recorded in the file information areas is preferably recorded in packet form in a double linked list. Each packet in a file information area is thus linked to the preceding and succeeding packets. The last packet in a file information area is preferably linked to the first packet in the next file information area and vice versa. This format allows the file system to rapidly and efficiently traverse incrementally recorded file and directory structures and to minimize the seek time necessary to locate and access files and directories recorded in one or more data area tracks.

Figure 9:
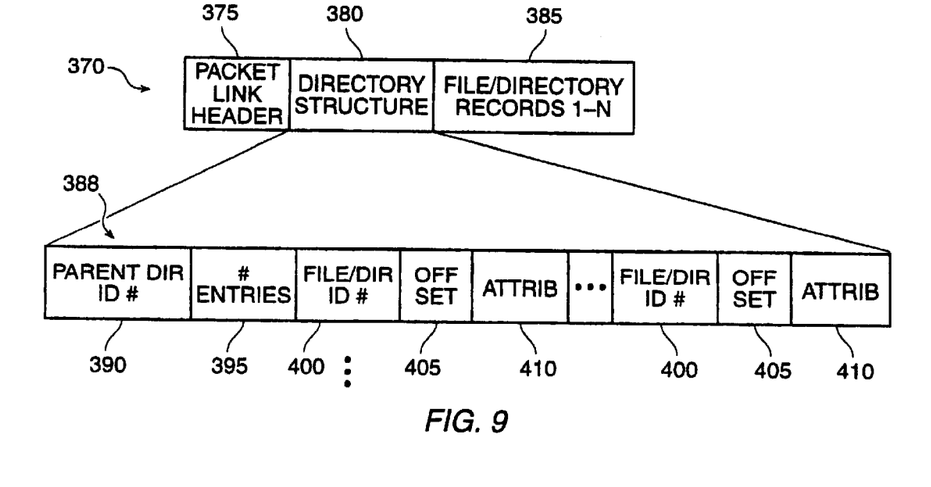
FIG. 9 is a schematic diagram illustrating a presently preferred packet format for incremental recording of file and directory information in connection with the present invention.

FIG. 9 illustrates a presently preferred packet format for the file information area data. Each packet 370 preferably has as a first field a packet link header 375, which is essentially identical in format to the packet link header 330 illustrated in FIG. 8, and the purpose of which, as described, is also the same as packet link header 330. The packet link header 375 contains the starting absolute block addresses for each preceding and succeeding packet in the same file information area, except for the first and last packets. The packet link header 375 of the first packet preferably contains the starting block address of the last packet in the previous file information area, if any, and the packet link header of the last packet preferably contains the starting block address of the first packet of the next file information area, if any. The packet 370 preferably also contains a directory structure field 380 and a field 385, which contains complete copies of the file/directory records 1-N for each file and/or directory entry contained in corresponding packets recorded in the corresponding data area.

The directory structure field 380 preferably contains a subset of the information contained in the file/directory record field 385. The subset of information is preferably selected to enable the file system to rapidly determine the relationship between directories, subdirectories and files. This ability allows the file system to quickly order files and directories in response to directory list commands and the like, and to rapidly access files and directories without having to chain through the file/directory records. Thus, only the basic information necessary to locate and order the directories and files is included, and other information concerning the contents of files, for example whether compressed or uncompressed, is excluded. Each directory, subdirectory and file is preferably assigned a unique ID number based on its order in the directory chain. For example, the root directory is assigned ID No. 1, the first subdirectory under the root directory is assigned ID No. 2, the last subdirectory is assigned ID No. N, the first file under the directory is assigned ID No. N+1, and so on. Within each directory, all subdirectories are assigned consecutive ID numbers, followed by all files. Similarly, within each subdirectory, sub-subdirectories are consecutively numbered, followed by files.

The directory structure field 380 contains an entry 388 for each parent directory, preferably sorted by parent directory ID number. Thus, each entry preferably includes as a first subfield 390 a parent directory ID number. The next subfield 395 preferably contains the number of entries in the PA parent directory, i.e., the number of subdirectories and files. The next subfield 400 preferably contains the file/directory ID number of the first file or subdirectory in the parent directory. The next subfield 405 preferably contains the offset address within the packet 370 for the complete file/directory record for the file or subdirectory entry identified in subfield 400. The next subfield 410 preferably contains a copy of the attribute field for that file or subdirectory entry. The attribute flags can be used to determine the entries to include in a directory listing or for other purposes. For example, by reference to various flags in the attribute field it can be determined whether a file has been deleted, updated or moved. As a result, that file may be deleted from a directory listing or listed in another directory, for example. Reference to the attribute field may also be useful if it is desired to list all previous versions of a file which has been updated, for example. Subfields 400, 405 and 410 are repeated for each subdirectory and file in the parent directory.

Figure 11:
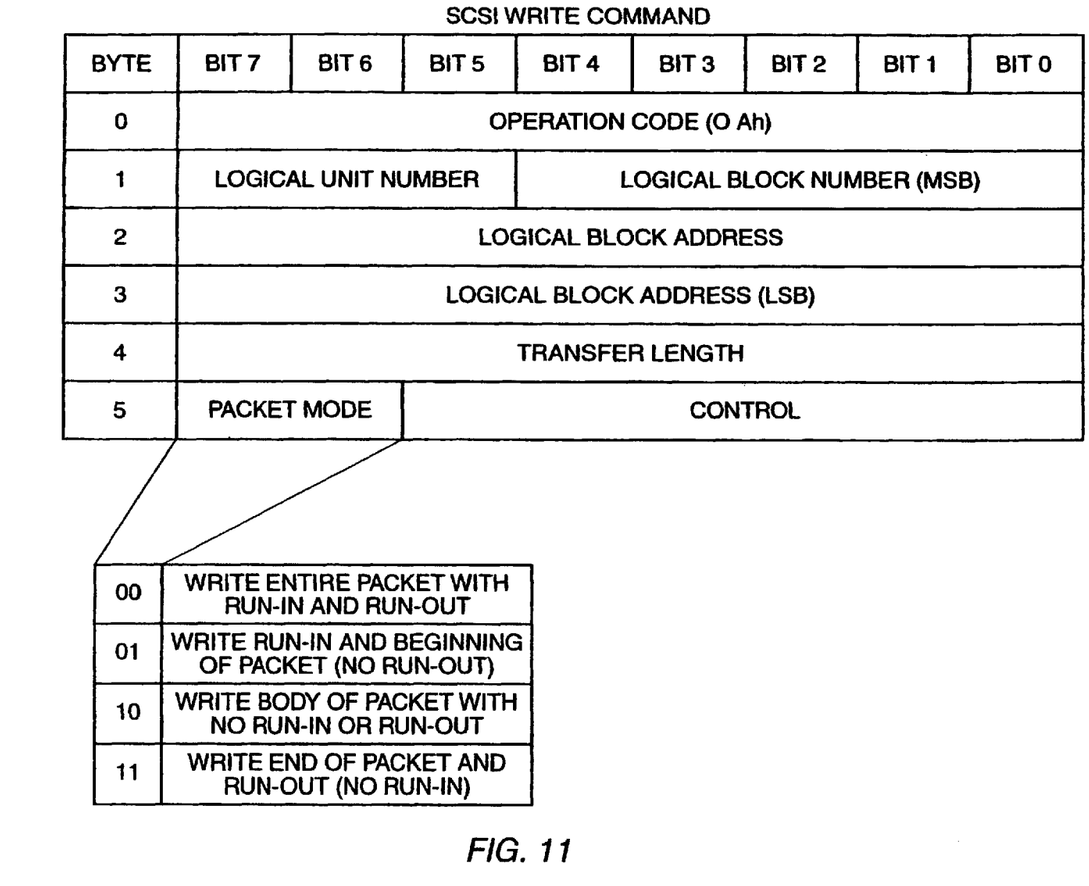
FIG. 11 is a schematic diagram illustrating a presently preferred format of a SCSI write command for use with the present invention.
Figure 12:
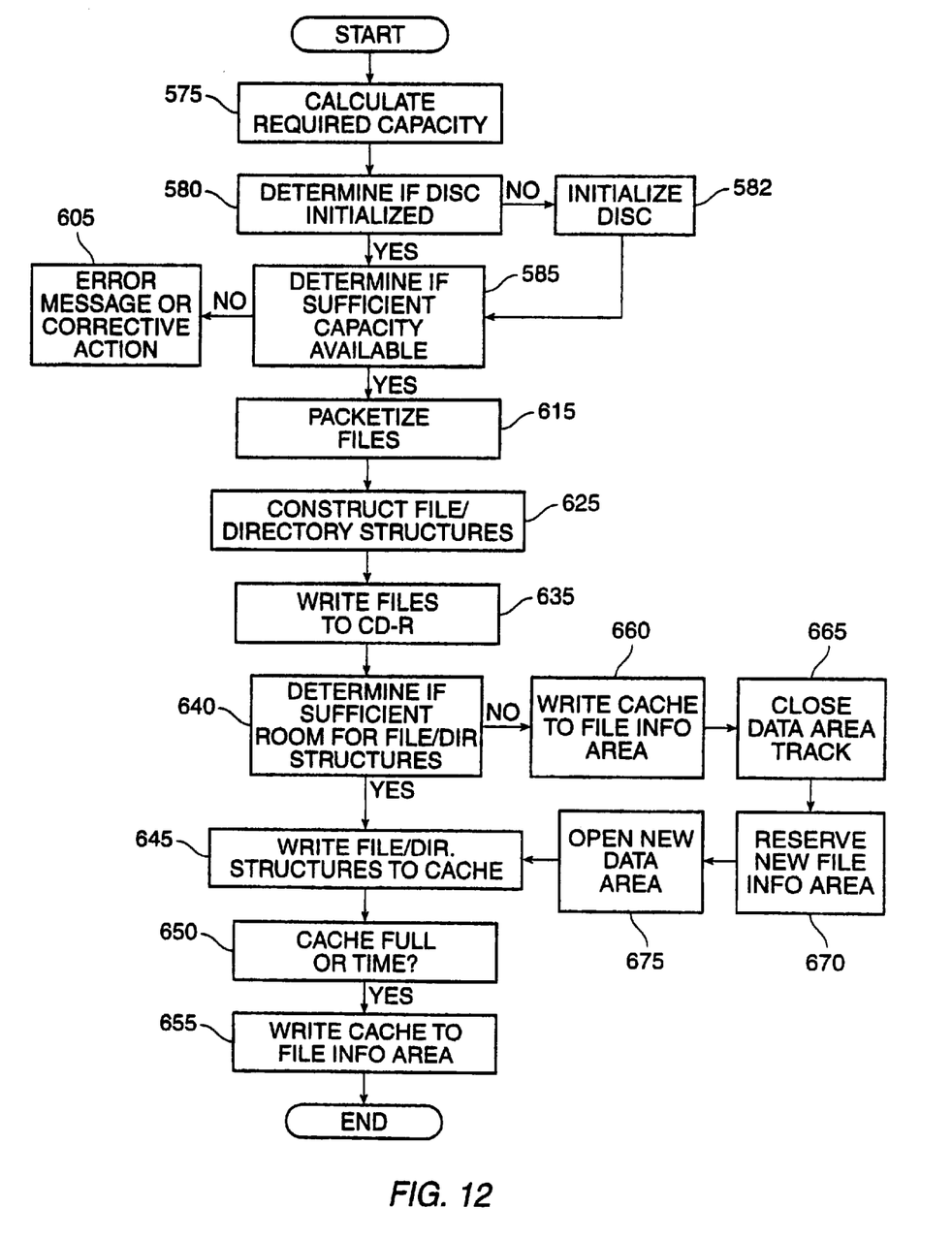
FIG. 12 is a flow chart illustrating a presently preferred mode of operation of the present invention.

Having described the presently preferred logical data and file/directory structures which comprise an important part of applicant's new and unique file system, attention will now be turned to describing a presently preferred mode of operation, with reference to FIGS. 11–14. Referring first to FIG. 12, in order to record one or more selected files, the file system 55 first calculates in step 575 the total storage capacity that will be required to record the selected files. In this step, the file system accumulates the sizes of the files in bytes, for example from their respective directory information on hard disk 35. It should be noted that the preferred file system operates equally well with compressed or uncompressed files. In addition, based on the packet size being used, the file system takes into account the amount of storage that will be required for overhead, such as link, run-in and run-out blocks required for Orange Book compliance, packet linking, etc.

Next, in step 580, the file system determines whether the CD to be recorded has previously been initialized. The file system issues a SCSI command to the CD-R to read the PMA. If the disc has previously been initialized, the PMA will contain information showing track one as reserved in the current session. If the disc has been previously initialized, the file system proceeds to the next step. If the disc has not been initialized, then in step 582, the file system initializes the disc by reserving a first track of the current session for the ISO or ECMA file/directory structure area 300, a second track for the first file information area 305, and a third open track for the first data area 310. The file system then proceeds to step 585.

In step 585, the file system determines the available remaining storage capacity of the CD to be recorded, i.e., the remaining storage capacity of the current data area.

This is preferably accomplished by issuing a standard SCSI READ CAPACITY command to the CD-R 15, which returns the next available recordable address and remaining recordable capacity. In step 595, the file system compares the available capacity of the CD with the required capacity, taking into account the need to reserve sufficient storage on the disc to record the required lead-out area. If sufficient capacity does not exist on the CD to store all of the selected files, the file system may initiate any of several suitable actions in step 605. For example, the file system may initiate a suitable error message and abort the operation. Alternatively, the file system may initiate a message to the user to deselect files, to substitute a CD having the necessary available capacity, or to compress the files if they are not already compressed.

If the CD has sufficient capacity, in step 615 the file system packetizes the files to be recorded. In this step, the files are divided into data blocks, according to the standard Orange Book block sizes, to be included in the data block fields 345 of one or more packets, a procedure which is well known. If compatibility with level 1 ISO 9660 CD-ROM players and drivers is desired, the files are divided so that each packet contains one or more complete files and no file spans two or more packets. In addition, if ISO 9660 compatibility is desired, the files will be blocked so that each begins on a block, i.e., sector boundary. However, these are not necessary requirements of the file system of the present invention, which readily accommodates files spanning one or more packets, and which can operate quite well without ISO 9660 compatibility. The size of the packets may be either fixed or variable, as desired. Again the file system of the present invention readily accommodates either. If the packet. size is fixed, known optimization techniques may be used to minimize the number of packets necessary given the sizes of the files to be recorded. Insofar as determining packet size is concerned, there are a number of factors that may be taken into consideration, including the size of the host's output buffer, the sizes and numbers of the files to be recorded, and the size of the CD-R input buffer. Packet sizes may be varied depending on these and other factors to maximize the speed and efficiency of the recording process. Often, however, a packet size equal to the size of the CD-R's buffer is desirable so as not to introduce the potential for buffer under-run errors.

Also in step 615, the file system constructs the packet link headers 330, directory fields 335 and file/directory record fields 340 for each packet. In constructing the packets, the file system knows the number of data blocks assigned to each, the number and sizes of the file/directory records, etc., and hence the total size of each packet. Taking the size of each packet into account, the known next recordable address from the CD-R, the Orange Book requirements, and the known packet format, it is straight forward matter for the file system to determine the preceding and next packet addresses for inclusion in the packet link header field 375. For example, the starting address of the first packet is simply the next recordable address plus the required link and run-in blocks. The starting address of the next packet is the starting address of the current packet plus the packet size, plus the required run-out blocks. The starting address of each succeeding packet may be determined in the same manner. For each succeeding packet, the starting address of the preceding packet has already been determined and therefore may simply be inserted in field 350.

In case of an error during the writing of packets to the CD-R, the file system preferably uses the link information to recover. For example, the file system may determine the starting address of the last recorded data packet by reading down the chain of recorded packets until the last completely recorded packet is identified. Writing may then be restarted from that point. Alternatively, the file system could include in field 330 a special signature code, for example in a subfield 357. Then, starting with the next recordable address, the file system could read back block by block until this signature is recognized, indicating the last recorded packet.

The directory field information and the file/directory records may be filled in from directory information and file attributes contained on the hard disk 35, for example, of the host computer system 10 for the selected files and/or directories. This may be supplemented or replaced as desired by allowing the user to provide additional or replacement information for the selected file or files. Other information in the file/directory records 340, such as the starting sector address of the file or directory entry, are calculated by the file system starting from the next recordable address and taking into account the link and run-in blocks, as well as the blocks required for the packet link header 330, directory field 335, and file/directory records 340, as well as the order and sizes of the files within the data block field 345 of each packet.

In step 625, the file system performs similar calculations to construct the file information area packet or packets 370 containing the file/directory structures for the files/directory entries to be recorded. The file system calculates the starting address of each packet, and each preceding and next packet for the packet link header 378 starting with the next recordable address in the reserved information track obtained from the CD-R and proceeding in the same manner as described above. The file directory records 385 are simply copied from the file/directory records 340 from the corresponding data area packet(s). For the directory structure field 380, the file system assigns the directory and, file ID numbers for each parent directory, subdirectory and file based on their existing relationships, as determined, for example, from the directory of hard disk 35 of host computer 10, or as supplied by the user. The offset address field 405 for each file/directory record in the packet is determined by the file/directory ID number and the total size of the file/directory records preceding the particular record. The attribute field 410 is copied from the attribute field from the corresponding file/directory record.

After the file system completes building the file data packets to be recorded in the current data area, and the file/directory structure packets to be recorded in the current file information area, in step 635 it sequentially writes the file data packets to the CD-R. Either or both of two presently preferred write procedures illustrated in FIGS. 13 and 14 may be used depending on whether fixed or variable packets are used and on the size of the files to be written.

Each of the packet writing procedures preferably employs a standard SCSI WRITE command, an example of which is shown in FIG. 11. It should be noted that while the exemplary SCSI WRITE command shown in FIG. 11 is in the common 6 byte format, the equally well known 10 byte format could also be used. In addition, it will be noted that in the exemplary command, high order bits 7 and 6 of control byte 5 are used to designate a packet mode code. The SCSI standard reserves these bits for vendor use and they are used in the present invention to implement the unique feature of the invention whereby lengthy files may be written to the CD-R in a number of packets with a number of WRITE commands, while retaining the recorded form of a single packet, if desired, for ISO 9660 compatibility.

Thus, packet mode 00 designates the standard SCSI write command in which the CD-R is instructed to record a complete packet, framed by link, run-in and run-out blocks. It should be noted that the file system need not do anything with respect to writing link, run-in or run-out blocks when a packet is written because the control firmware in standard Orange Book compliant CD-R's automatically controls the CD-R recording hardware to do so.

Packet mode 01 instructs the CD-R to record a run-in block and the first part of a packet without terminating with a run-out block. Packet mode 10 instructs the CD-R to record the data presented with no run-in or run-out blocks, and packet mode 11 instructs the CD-R to record the data followed by a run-out block. The use of WRITE commands in the sequence of packet mode 01, 10, and 11 thus allows a lengthy file to be written and to appear in recorded form as a single long packet, independent of host or CD-R buffer sizes, or other considerations (such as to avoid buffer under-run conditions).

No hardware modifications are required to a standard Orange Book compliant CD-R to implement modes 01, 10, and 11. A simple change to the control firmware to recognize these modes and to direct the recording hardware when and when not to record link, run-in and run-out blocks as described above is all that is required. This simple modification is well within the ordinary skill of persons engaged in the CD-R arts and a description thereof is therefore unnecessary for a complete understanding of the invention.

Figure 13:
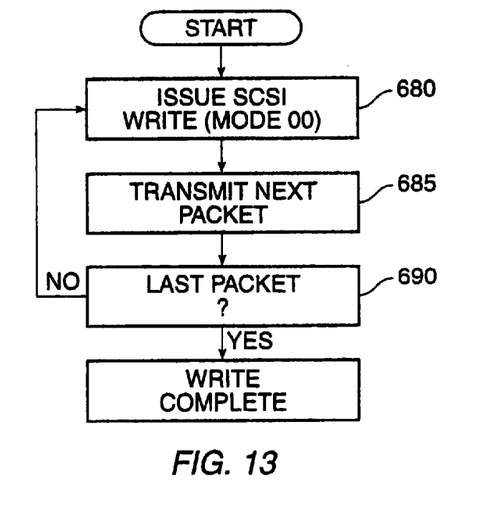
FIG. 13 is a flow chart illustrating one presently preferred procedure for writing packets to a compact disc recorder in a presently preferred file system embodying the invention.

Referring to FIG. 13, in one writing procedure useful with fixed, relatively small packets, the file system issues a SCSI WRITE command in Mode 00 in step 680. The SCSI WRITE command contains in bytes 2 and 3 the starting LBA (logical block address) at which the first packet is to be written, as previously calculated by the file system, and the length in bytes of the packet in byte 4, also as previously calculated. In step 685, the file system transmits the first packet to the CD-R, which records it on the CD, starting at the specified LBA. In step 690 the file system checks whether another packet remains to be written. If not, the write process is complete. If another packet is to be written, the driver issues another SCSI command and the process repeats until all packets have been written.

Figure 14:
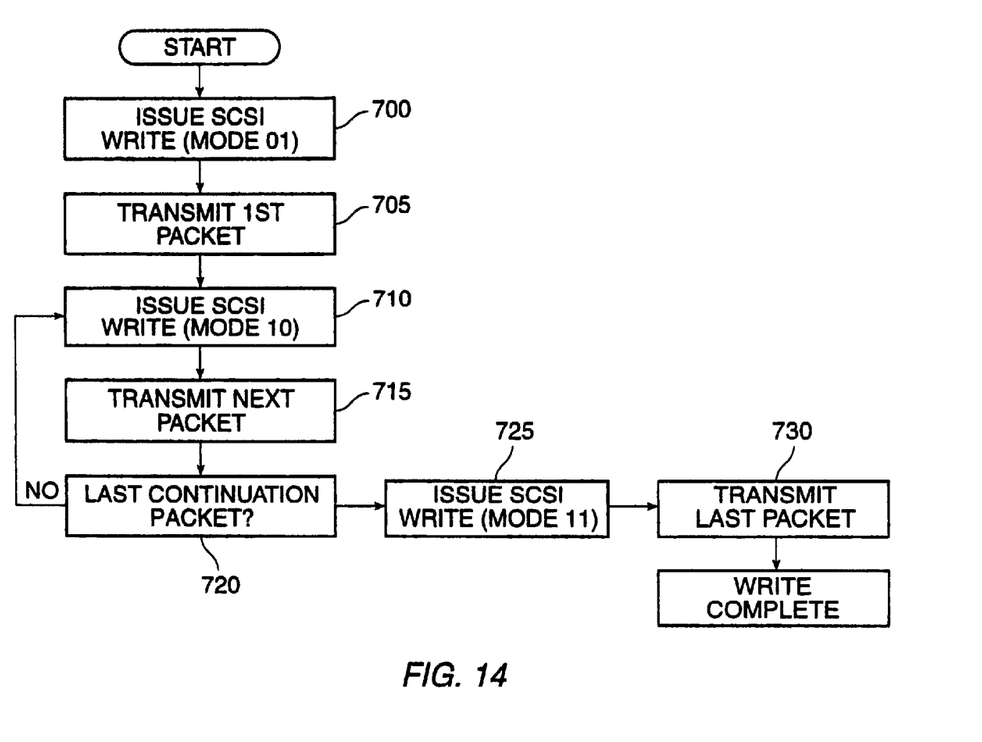
FIG. 14 is a flow chart illustrating a second presently preferred procedure for writing data packets to a compact disc recorder in a presently preferred file system embodying the invention.

FIG. 14 illustrates a second write procedure which is useful for long files that exceed the CD-R buffer size, or which for other reasons need to be written to the CD-R using several packets. In order to maintain compatibility with CD-ROM players and drivers implementing level 1 ISO 9660, this procedure causes the CD-R to record the file as if it contained within a single packet. In this procedure, the file system in step 700 issues a SCSI write command in packet mode 01. The LBA and transfer length fields in this command are determined in the same manner as described above for the packet mode 00 command. In step 705, the driver transmits a first packet to the CD-R. This causes the CD-R to record a link block, four run-in blocks, and the data contained in the packet starting at the specified starting LBA, as specified by the Orange Book. However, the CD-R does not record any run-out blocks. Next, in step 710 the file system issues another SCSI WRITE command in packet mode 10 and in step 715 transmits a second packet of data to the CD-R. The packet mode 10 WRITE command causes the CD-R to record the packet at the specified starting LBA (which it is assumed immediately follows the last LBA of the preceding packet)without any link, run-in or run-out blocks being recorded. In step 720, the file system determines whether any additional continuation packets remain to be written. If so, the packet mode 10 writing process is repeated until all continuation packets have been written. When all continuation packets have been written, in step 725 the file system issues a final SCSI WRITE command in packet mode 11. In step 730 it transmits the last packet to the CD-R. In this writing procedure, it is assumed the last packet written will always be written in packet mode 11 so that the recorded packet data will be followed by the run-out blocks required for Orange Book compatibility. By writing in this manner, long files that are written to the CD-R in multiple packets, are thus recorded in the form of a single long packet, thus retaining compatibility with the ISO 9660 standard. It should be noted that although the procedure illustrated in FIG. 14 includes one or more continuation packets written in packet mode 10, the same procedure would work with only two packets to be written. In that case, the first packet would be written in packet mode 01 and the second in packet mode 11. Packet mode 10 would not be used.

In the preferred continuation packet write procedure of FIG. 14, the file system may determine the number of continuation packets to be written in any number of ways. One way, for example, is to simply divide a large file into packets, each being the same size as the CD-R's input buffer. If this resulted in ten packets, for example, the first packet would be written in packet mode 10, and the tenth and last packet in packet mode 11.

Referring back to FIG. 12, when all of the packets containing the selected files have been written to the CD-R and recorded, the file system in step 640 determines if there is sufficient room remaining in the current file information area to write the packet(s) containing the file/directory structures for the files and directory entries just recorded, together with any packets containing file/directory structures in cache and not yet recorded. If there is sufficient room in the current file information area, the file system attempts to write the current file/directory structures into the cache in step 645. In step 650, if writing to the cache would cause it to become full, then in step 655 the current file structures and those in cache are transmitted to the CD-R and recorded in the current file information area. The processes described with respect to FIGS. 13 and 14 are suitable for writing the file/directory structure packets to the CD-R.

However, if in step 640, there is insufficient room remaining in the current file information area to accommodate the cache contents and the current file/directory structures, then in step 660, the file system writes the file/directory structure packets from cache into the file information area, maintaining the linking between packets as previously described. The file system then closes the track for the current data area in step 665, reserves a new track for the next file information area in step 670, and opens a new data area track in step 675. The file system then returns to step 645 and writes the current file/directory structure packet(s) into the cache, including the link to the last packet in the previous file information area. That operation completes the recording process for the selected file or files.

As one alternative to the foregoing, the file system could make the determination whether to record the file/directory structure packets in the file information area based on the status of the cache, but instead on a timed basis. In this alternative, the file system would record any cache contents in the current file information area at predetermined intervals regardless of the state of the cache. For example, the file system might be invoked to record the cache contents in the file information area on a daily basis.

From time to time the user may select additional files to be recorded. Each time additional files are selected, the process illustrated in FIG. 12 is carried out by the file system.

From time to time the user may also wish to perform operations such as adding or deleting directories, or deleting, moving or updating files. The preferred file system according to the invention supports such operations. In response to a command to add or delete a directory, the file system constructs a data packet to be recorded in the current data area and a packet to be recorded in the current information area. These packets are constructed as illustrated in FIGS. 8–10 and described above, and contain the appropriate attribute fields to indicate whether the directory record is being added or deleted. Similarly with respect to deleting or moving a file, the file system constructs packets to be recorded in the data and file information areas according to FIGS. 8–10. These packets contain the attribute fields indicating the status of the file. In either scenario, the file system then writes the packets to the data and file information areas in the same manner as previously described with respect to FIGS. 12–14.

The preferred file system of the invention allows the user to read recorded files from a partially or completely recorded CD using a standard Orange Book compliant CD-R at any time. Standard SCSI READ commands are preferably used to read back the recorded packets and a substantially reverse process is carried out by the file system to de-packetize and reconstruct the recorded files and directory information.

If at any time the user should desire for a partially or completely recorded CD to be readable by a CD-ROM player and driver implementing ISO 9660, the user may render the disc compatible simply by closing the current session. In, a presently preferred embodiment of the file system, when the current session is closed, the file system reads the file/directory structures from the file information areas contained in the current session, and re-records the same information in the reserved track one of the session in ISO 9660 compatible format. Alternatively, the file system could re-record the file/directory structure information in the first reserved track in ECRA 168 or another suitable format if desired. Alternatively, this process need not be carried out automatically upon closing the current session, but could be triggered on command from the user, if desired.

If desired, and if sufficient capacity remains on the CD after the current session is closed, the user may use the file system to open a new session and the entire mode of operation described above may be repeated.

Although the applicant has described herein a presently preferred embodiment of the invention, it will be apparent to persons skilled in the art that the invention is capable of other and different embodiments, and that the details of the preferred embodiment are capable of numerous modifications without departing from the spirit of the invention. Accordingly, the drawings and description are to be regarded as illustrative in nature only, and not as limiting the scope of the invention, which is to be determined by reference to the appended claims.

What is claimed is:

1. A method of incrementally storing data on a compact disc having a lead-in area, a program area having a plurality of sectors, and a lead-out area, comprising:
    selecting from time to time at least one file from a source to be stored on the compact disc;
    each time the at least one file is selected,
        determining a total storage capacity necessary to store the selected at least one file;
        determining an availability of sufficient storage capacity in the program area of the compact disc to store the selected at least one file;
        dividing the selected at least one file into one or more data blocks and creating at least one packet including at least one of the one or more data blocks;
        recording the at least one packet in the program area together with a corresponding link block, at least one run-in block, at least one data block, and at least one run-out block; and
        storing in a first storage area information identifying a location of the selected at least one file in the program area, the information being defined in a file information area that is associated as a pair with a data area; and
    from time to time recording in a reserved storage area defined as a first track in the program area information identifying the location of previously recorded files in the program area.

2. A method of incrementally storing data on a compact disc as recited in claim 1 including:
    recording with the selected at least one file link information to a location on the compact disc of a previously recorded file.

3. A method of incrementally storing data on a compact disc as recited in claim 1 wherein the lead-in, program, and lead-out areas of the compact disc are in a format compatible with the Orange Book standard.

4. A method of incrementally storing data on a compact disc as recited in claim 1 wherein the at least one packet is recorded in a format compatible with the Orange Book specification for linking packets recorded incrementally.

5. A method of incrementally storing data on a compact disc as recited in claim 1 wherein each packet contains at least one complete selected file.

6. A method of incrementally storing data on a compact disc as recited in claim 1 wherein the information stored in the reserved storage area identifying the location of previously recorded files in the program area is in ISO-9660 compatible format.

7. A method of incrementally storing data on a compact disc as recited in claim 1 wherein the information stored in the reserved storage area identifying the location of previously recorded files in the program area is in ECMA 168 compatible format.

8. A method of incrementally storing data on a compact disc as recited in claim 1 wherein the at least one packet is recorded in the program area with the beginning of each file starting on a sector boundary.

9. A method of incrementally storing data on a compact disc as recited in claim 1 wherein the at least one packet includes a variable number of data blocks.

10. A method of incrementally storing data on a compact disc as recited in claim 1 wherein the first storage area is in a host computer.

11. A method of incrementally storing data on a compact disc as recited in claim 1 wherein the first storage area is on the compact disc.

12. A method of incrementally storing data on a compact disc as recited in claim 1 wherein the program area includes a plurality of tracks.

13. A method of incrementally storing data on a compact disc as recited in claim 12 wherein the reserved storage area comprises a first track of the plurality of tracks.

14. A method of incrementally storing data on a compact disc as recited in claim 12 wherein the first storage area includes a second track of the plurality of tracks.

15. A method of incrementally storing data on a compact disc as recited in claim 1 wherein the method is repeated to create multiple sessions on the same compact disc.

16. A method of incrementally storing data on a compact disc as recited in claim 1 wherein the selecting of at least one file includes creating a file.

17. A system of incrementally storing data on a compact disc having a lead-in area, a program area having a plurality of sectors, and a lead-out area, comprising:
    means for selecting from time to time at least one file to be stored;
    means for, each time the at least one file is selected,
        determining a total storage capacity necessary to store the selected at least one file;
        determining an availability of sufficient storage capacity in the program area of the compact disc to store the selected at least one file; and
        dividing the selected at least one file into one or more data blocks and constructing at least one packet including at least one of the one or more data blocks;
    a compact disc recorder operable to receive and to record at least one packet in the program area of said compact disc together with a corresponding link block, at least one run-in block and at least one run-out block;
    the compact disc recorder storing in a first storage area each time the selected at least one file is recorded in the program area, information identifying the location of the selected at least one file recorded in the program area, the information being defined in a file information area that is associated as a pair with a data area; and
    the compact disc recorder operable to record from time to time in a reserved storage area defined as a first track in the program area information identifying the location of previously recorded files in the program area.

18. A system of incrementally storing data on a compact disc as recited in claim 17 wherein link information to a location on the compact disc of a previously recorded file in the program area is recorded with the selected at least one file in the program area.

19. A system of incrementally storing data on a compact disc as recited in claim 17 wherein the lead-in, program, and lead-out areas of the compact disc are in a format compatible with the Orange Book standard.

20. A system of incrementally storing data on a compact disc as recited in claim 17 wherein said at least one packet is recorded in a form compatible with the Orange Book specification for linking packets recorded incrementally.

21. A system of incrementally storing data on a compact disc as recited in claim 17 wherein each packet contains at least one complete selected file.

22. A system of incrementally storing data on a compact disc as recited in claim 17 wherein the information stored in the reserved storage area identifying the location of previously recorded files in the program area is in ISO-9660 compatible format.

23. A system of incrementally storing data on a compact disc as recited in claim 17 wherein the information stored in the reserved storage area identifying the location of previously recorded files in the program area is in ECMA 168 compatible format.

24. A system of incrementally storing data on a compact disc as recited in claim 17 wherein the compact disc recorder is operable to record the at least one packet with the beginning of each file starting on a sector boundary.

25. A system of incrementally storing data on a compact disc as recited in claim 17 wherein the at least one packet includes a variable number of data blocks.

26. A system of incrementally storing data on a compact disc as recited in claim 17 wherein the first storage area is in a host system.

27. A system of incrementally storing data on a compact disc as recited in claim 17 wherein the first storage area is on the compact disc.

28. A system of incrementally storing data on a compact disc as recited in claim 17 wherein the program area includes a plurality of tracks.

29. A system of incrementally storing data on a compact disc as recited in claim 28 wherein the reserved storage area comprises a first track of the plurality of tracks.

30. A system of incrementally storing data on a compact disc as recited in claim 28 wherein the first storage area includes a second track of the plurality of tracks.

31. A system of incrementally storing data on a compact disc as recited in claim 17 wherein each collection of files having location information recorded in the reserved storage area comprises a session, the system operable to create multiple sessions on the same compact disc.

32. A system of incrementally storing data on a compact disc as recited in claim 17 wherein the selecting of at least one file includes creating a file.

* * * * *